United States Patent [19]
McCaffrey et al.

[11] Patent Number: 5,927,480
[45] Date of Patent: Jul. 27, 1999

[54] ADJUSTABLE GUIDE RAIL SUPPORT

[75] Inventors: Peter P. McCaffrey; John P. Williamson, both of Wilmington, N.C.

[73] Assignee: Fenner, Inc., Manheim, Pa.

[21] Appl. No.: 09/172,490

[22] Filed: Oct. 14, 1998

Related U.S. Application Data

[62] Division of application No. 08/912,208, Aug. 15, 1997
[60] Provisional application No. 60/050,077, Jun. 13, 1997.

[51] Int. Cl.⁶ .................................................. B65G 21/20
[52] U.S. Cl. .......................................................... 198/836.3
[58] Field of Search ............................................ 198/836.3

[56] References Cited

U.S. PATENT DOCUMENTS

| | | | |
|---|---|---|---|
| 3,280,962 | 10/1966 | Stone et al. | |
| 3,647,051 | 3/1972 | Didas | 198/204 |
| 3,776,350 | 12/1973 | Tice | 198/204 |
| 3,800,938 | 4/1974 | Stone | 198/204 |
| 4,470,499 | 9/1984 | Sijbrandij | 198/836 |
| 4,502,594 | 3/1985 | Sijbrandij | 198/836 |
| 4,759,437 | 7/1988 | Bevins | 198/632 |
| 5,322,160 | 6/1994 | Markiewicz et al. | 198/836.3 |
| 5,492,218 | 2/1996 | Falkowski | 198/836.3 |
| 5,782,339 | 7/1998 | Drewitz | 198/836.3 |

*Primary Examiner*—Joseph E. Valenza
*Assistant Examiner*—Mark Deuble
*Attorney, Agent, or Firm*—Dann, Dorfman, Herrell and Skillman; Henry H. Skillman

[57] ABSTRACT

A support for the guide rail of a conveyor which enables the guide rail to be adjusted among a plurality of pre-set positions in a quick and simple manner with precision. The guide rail is supported by a generally horizontal support post which is supported by a vertical stanchion on the frame of the conveyor alongside the conveyor belt. The post has a latch pin and is mounted for slidable axial movement in the stanchion and is axially biased to urge the latch pin toward the stanchion. The stop member comprises a hollow cylindrical member slidably and rotatably mounted on the post between the pin and the stanchion. The end of the stop member confronting the latch pin has a plurality of receptacles to receive the latch pin, the axial depth of the receptacles are different to provide different positions for the post and thereby the guide rail.

7 Claims, 2 Drawing Sheets

PRIOR-ART

ADJUSTABLE GUIDE RAIL SUPPORT

RELATED APPLICATION

The present application is a divisional application of co-pending U.S. patent application Ser. No. 08/912,208 filed Aug. 15, 1997 and a provisional of 60/050,077 filed Jun. 13, 1997.

FIELD OF THE INVENTION

The present invention relates to a guide rail support for a conveyor line, and is particularly applicable to adjustable guide rails for conveyor lines for bottling apparatus.

BACKGROUND OF THE INVENTION

Conveyor lines for bottles normally have rails positioned along opposite sides of the line in order to prevent the bottles from falling away from the moving conveyor belt. The side rails are disposed on opposite sides of the conveyor belt and the bottles travel between the fixed rails. When a conveyor line is converted to transport bottles of different size, the conventional method for adjusting the spacing of the side rails depends on the skills of the mechanics to avoid maladjustment.

Adjustable mounts for the side rails are conventional, but the need for precise adjustment of the side rails after changing their position has made such adjustments subject to mechanic error.

A proposal to eliminate mechanic error is disclosed in U.S. Pat. No. 5,492,218 issued Feb. 20, 1996, wherein the rails are supported by a horizontal support post slidable in a fixed horizontal sleeve. The support post has a rail clamp at one end which projects beyond the inner end of the sleeve toward the conveyor line. The post is biased outwardly away from the conveyor line by a spring mounted within the sleeve, and the position of the side rail is determined by placing a spacer around the projecting end of the support post between the inner end of the sleeve and the inner end of the post which mounts the clamp. The rails are clamped by a series of posts which are all mounted in sleeves which are secured to the frame of the machine so that their inner ends are equidistant from the conveyor line. Each post is provided with a spacer to determine the desired position of the rail relative to the centerline of the conveyor line. When it is desired to change the position of the rails, all of the spacers must be replaced with different spacer which establish the new position of the rail.

Although proper use of spacers avoids mechanic errors, it has been found that spacers are lost when exchanging spacers, and where the change in spacing is not large, the wrong spacers may be substituted.

SUMMARY OF THE INVENTION

The present invention provides an adjustable support for a conveyor side rail which is easily adjusted to predetermined positions with little mechanical skill on the part of the operator.

More specifically, the present invention provides a simple and effective device for adjusting the lateral positions of the side rails on a conveyor system among a plurality of pre-set positions.

The present invention provides a rotary device captured on each horizontal support post, the devices being rotatable in the nature of an adjusting dial which is readily observed by the mechanic to insure that all posts have been adjusted to the proper position, assuring the desired alignment of the guide rails relative to the centerline of the conveyor system.

The illustrated embodiment of the adjusting mechanism includes a spring-loaded member mounting a horizontal side rail post having a fixed latch pin, and an adjustable stop having a plurality of receptacles for engaging the latch pin for determining the longitudinal position of the post, and thereby the side rail. The adjustable stop provides multiple positions, each position providing a side rail position accommodating a bottle of a given size.

DESCRIPTION OF THE PREFERRED EMBODIMENTS

Figure 1:
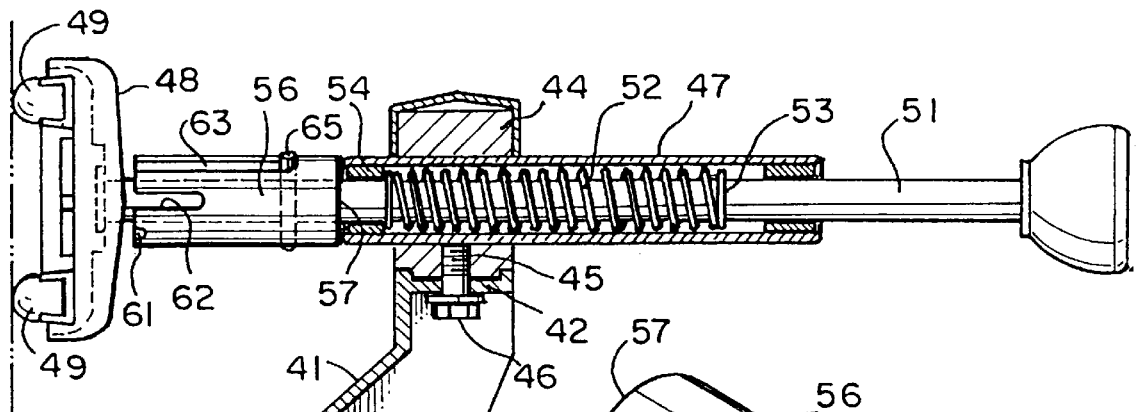
FIG. 1 is a sectional view through an adjustable rail support embodying the present invention, showing the adjustable seat in one limit setting.

FIG. 1 illustrates a mounting assembly embodying the present invention, which is adapted to replace the adjustable conventional mounting assemblies of the prior art.

Figure 4:
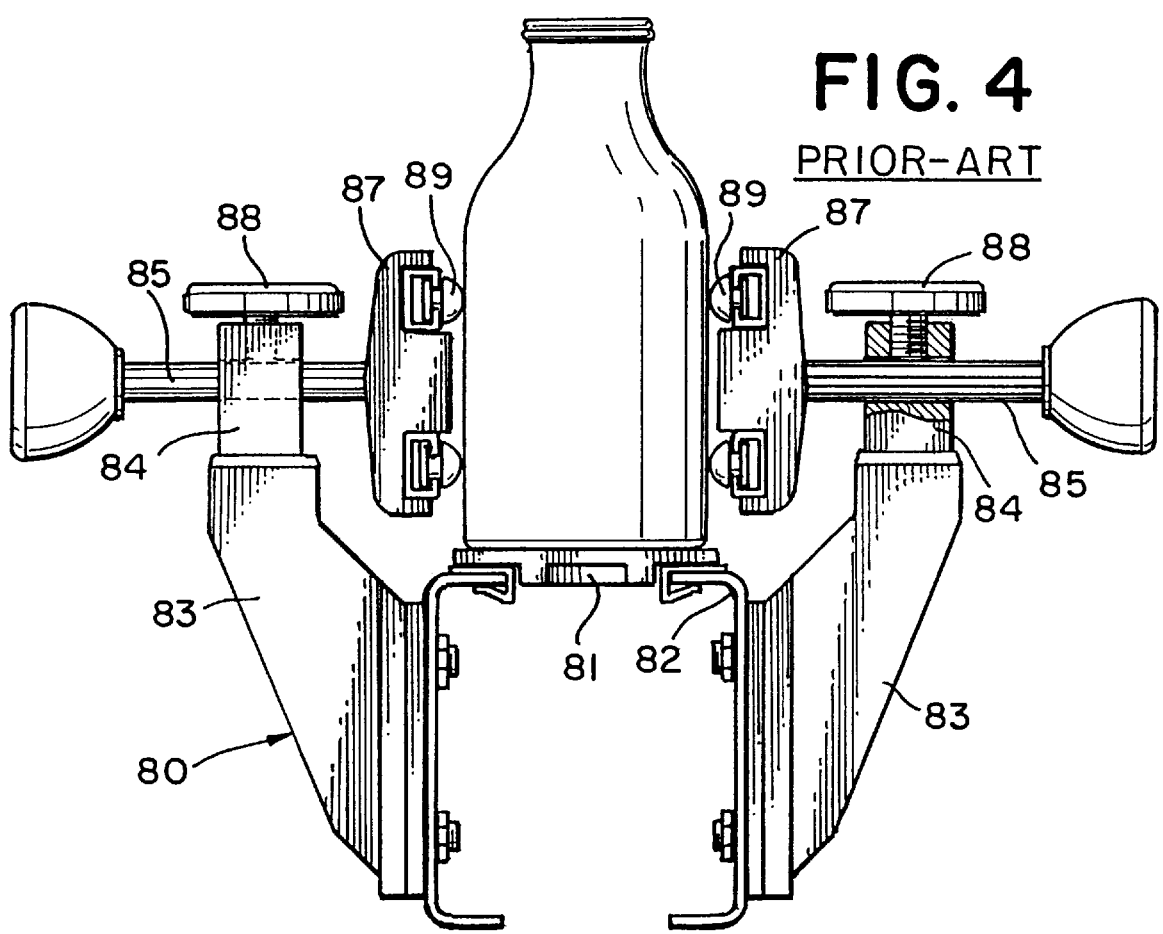
FIG. 4 is an illustration of a prior art device showing a bottle conveyor having a conventional mounting assembly which the present invention is designed to replace.

FIG. 4 shows a prior art conveyor in which a conveyor 80 has a run 81 which travels on a bed 82 formed by confronting channel members. At intervals along the bed 82, for example 4–6" intervals, mounting brackets 83 project outwardly and upwardly and terminate in upstanding stanchions 84. Each stanchion has a through-slot (not shown) for accommodating the post 85 which mounts at its inner end a rail 87 for supporting and positioning bumpers 89. The stanchion 84 has a through-bore into which is threaded a thumb screw 88. The thumbscrew 88 has an adjusting knob at the top and a threaded shaft which engages in the bore and bears against the post 85 as it passes through the stanchion 84, thereby anchoring the post against lateral movement through this slot. When it is desired to change the spacing between the guide rails 87, the mechanic releases the thumb screw 88 and adjusts the post 85 to proper extent to provide the desired spacing between the rails 87,87. As is apparent, the proper adjustment of the side rails 87 relies on the ability of the mechanics to properly position the posts 85 in the stanchions 84 so as to overlie the conveyor 81 as desired.

As shown in FIG. 1, the present invention provides a mounting bracket 41 adapted to be mounted alongside the conveyor belt having a post projecting angularly upward and outward to terminate in a seating flange 42. The flange 42 mounts an upstanding stanchion 44, having a vertical bore 45 threaded to receive a bolt 46 which anchors the stanchion 44 to the flange in an upright position. The stanchion 44 mounts a transverse sleeve 47 adapted to slidably receive an elongated post 51 having a guide-rail bracket 48 mounted on its inner end so as to overlie the conveyor. The bracket 48 is adapted to mount rails or bumpers 49 extending parallel to the conveyor.

The mounting post 51 comprises a cylindrical rod and is displaceable longitudinally within the sleeve 47 toward and away from the conveyor path of travel. The post 51 is biased axially in a direction away from the conveyor by a coil spring 52 mounted within the sleeve 47 and seated at one end against a stop washer 53 on the post and at the other end against a bottom plug 54 anchored in the inner end of the sleeve 47 which, in turn, is fixed in the stanchion 44. The rod 51 is slidable through the bottom plug 54 so as to be displaceable longitudinally within the sleeve.

Figure 3:
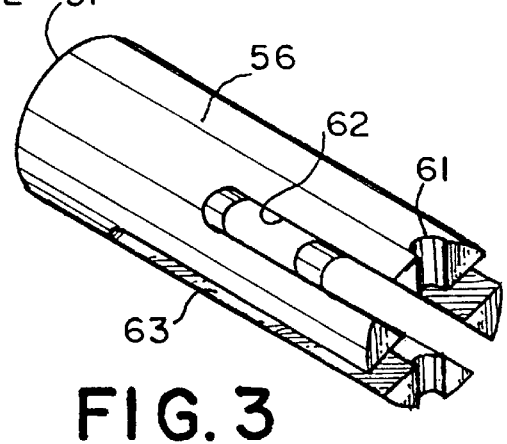
FIG. 3 is a detached perspective view of the adjustable seat.

Means is provided to selectively position the rod 51 at one of a plurality of settings. An adjustable hollow cylindrical stop member 56 is rotatable about the longitudinal axis of the rod 51. The stop 56 has a cylindrical bore which slidably and rotatably receives the rod 51. At one end, the adjustable stop 56 bears against the inner end of the end wall 54 of the sleeve 47 and/or the plug 54. At its other end, the adjustable stop is provided with a series of axially-extending slots or receptacles 61, 62 and 63 arranged in diametrically opposite pairs. In the present instance, the receptacles 61, 62 and 63 pass through the cylindrical wall of the hollow cylindrical stop member 56 as shown in FIG. 3. Each pair of slots 61, 62 and 63 has diametrically opposite segments in the hollow cylindrical wall, and the pairs are positioned at 60° increments about the circumference of the wall.

The adjustable stop member 56 operates to position the mounting post 51 and at one of three settings determined by the receptacle pairs 61, 62 and 63. To this end, the post 51 is provided with a latch pin 65 projecting from the post 51 at diametrically opposite points so as to engage in the diametrically opposite components of the receptacle pairs 61, 62 and 63.

In operation, to adjust the position the bracket 48, the rod 51 is thrust inwardly toward the conveyor against the bias of the spring 52 so as to free the latch pin 65 from the receptacles in which it is engaged. Once the pin is free from the receptacles, the adjustable stop 56 may be rotated to register a second receptacle pair with the latch. Releasing the post 51 thereby engages the latch in the new receptacle pair and repositions the new bracket 48 to the setting determined by the depth of the receptacle pair. Thus, the position of the bracket 48 may be quickly adjusted to any one of the three settings provided by the receptacles 61, 62 and 63 in the adjustable stop 56.

Figure 2A:
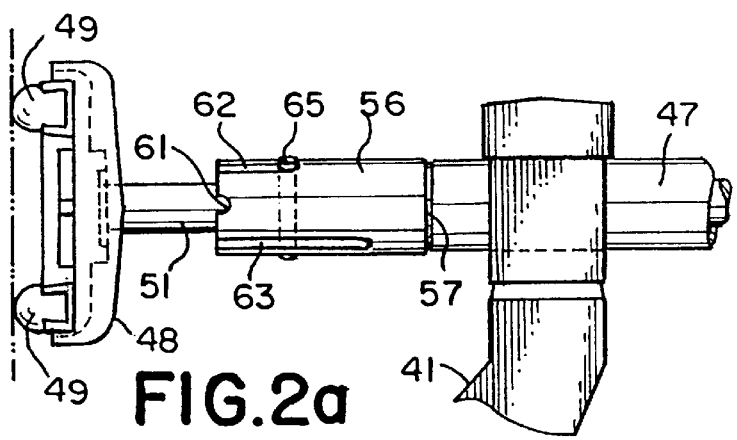
FIG. 2a is a fragmentary front view of the adjustable seat in an intermediate setting.
Figure 2B:
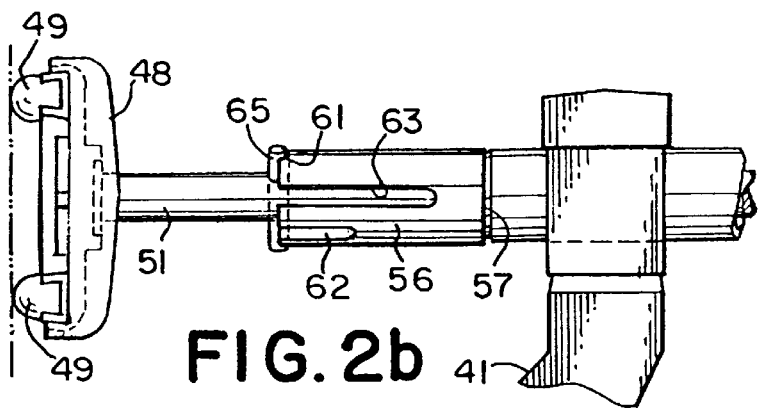
FIG. 2b is a fragmentary front view of the adjustable seat in an opposite limit setting.

The innermost setting of the bracket 48 is illustrated in FIG. 1, and is determined by the spacing between the outer end of the slot 53 and the inner end of the sleeve 47. The intermediate setting is illustrated in FIG. 2a, and is determined by the spacing between the outer end of the slot 62 and the inner end of the sleeve 47. The outermost setting is illustrated in FIG. 2b, and is determined by the spacing between the outer limit of the receptacle 61 at the inner end of the stop member 56 and the inner end of the sleeve 47. In this embodiment of the invention each position of the bracket 48 may be selected independently of the other positions. If more than three alternative positions are required, a second stop member having the required receptacles may replace the member 56.

Comparing the illustrated embodiment to the adjusting assembly shown in FIG. 4, the adjustable stop assures proper positioning of the side rails, in one of three pre-set settings at each side of the conveyor run. The adjustable stop engages a latch pin fixed on the post and providing a series of receptacles providing the designed spacings from sleeve which is fixed relative to the conveyor. In this way the opportunity for mechanic error in adjusting the side rails to accommodate differently sized bottles is minimized.

While a particular embodiment of the invention has been herein illustrated and described, it is not intended to limit the invention to such disclosure, but changes and modifications may be made therein and thereto within the scope of the following claims.

What is claimed is:

1. An adjusting mechanism for a side rail for a conveyor adapted to run in a path of travel along a bed, said bed having support brackets extending upwardly and outwardly from the bed to support the side rail at spaced-apart locations along the length of the path of travel, said adjusting mechanism comprising an upstanding stanchion mounted on each of said support brackets, each said stanchion having a through-slot transverse to said path of travel, a post mounted in said through-slot for longitudinal adjustment transverse to said path of travel, said post having a guide rail bracket adapted to mount a guide rail generally parallel to said conveyor path, and a stop mounted for adjustment on said post, said stop having a series of receptacles to provide a plurality of settings for the longitudinal position of said post and thereby said guide rail, said post having a pin adapted to engage one of said series of receptacles affording relative displacement of said pin and said receptacles between engaged and disengaged positions, in the engaged position said pin being engaged in at least one of said receptacles to anchor the post against longitudinal displacement in said transverse through-slot and in the disengaged position said pin being disengaged from said receptacles to afford relative displacement of said post and said stop to enable registry of said pin with a different receptacle in said series.

2. An adjusting mechanism for a side rail for a conveyor adapted to run in a path of travel along a bed, said bed having support brackets extending upwardly and outwardly from the bed to support the side rail at spaced-apart locations along the length of the path of travel, said adjusting mechanism comprising an upstanding stanchion mounted on each of said support brackets, each said stanchion having a through-slot transverse to said path of travel, and a stop adjustably mounted relative to said stanchion, a post mounted in said through-slot for longitudinal adjustment transverse to said path of travel, said post having a guide rail bracket adapted to mount a guide rail generally parallel to said conveyor path, a series of receptacles in said stop to provide a plurality of settings for the longitudinal position of said post and thereby said guide rail, a pin on said post, said adjustable stop mounting affording displacement of the series of receptacles between engaged and disengaged positions, in the engaged position said pin being engaged in at least one of said receptacles to anchor the post against longitudinal displacement in said transverse through-slot and in the disengaged position said pin being disengaged from said receptacles to afford displacement of said post in said through-slot relative to said stop to effect registry of said pin with a different receptacle.

3. An adjusting mechanism according to claim 2 wherein said post comprises a cylindrical rod having a longitudinal axis transverse to said path of travel, said pin comprising at least one pin projecting from said cylindrical rod generally perpendicular to its longitudinal axis intermediate said upstanding stanchion and said guide rail bracket, said stop comprising a hollow cylindrical member having a cylindrical bore which slidably and rotatably receives the rod, said stop member being mounted on said rod between said pin and said upright stanchion, and means to apply axial bias to said rod in a direction urging the pin toward the stanchion, said stop member limiting the axial movement of said rod, said receptacles in the stop member being positioned at the end of the stop member which confronts the pin and being positioned circumferentially of the stop member to receive the pin, said receptacles being of differing axial length to position said rod at different axial positions, in accordance with the receptacle engaged by said pin.

4. An adjusting mechanism according to claim 3 wherein said latch pin extends diametrically through said rod and projects beyond said rod at diametrically opposite sides thereof, said receptacles of the stop member comprise a series of receptacles arranged in diametrically opposite pairs, the diametrically opposite receptacles of each pair having the same axial depth, and each of said pairs having a different axial depth.

5. An adjusting mechanism according to claim 4 wherein said pairs of receptacles are of three axial lengths and are equally spaced apart at 60° intervals circumferentially of said stop member.

6. An adjusting mechanism according to claim 3 wherein said bias means comprises a hollow sleeve mounted in said upright stanchion coaxial with said rod and surrounding said rod with a space therebetween, and a coil spring mounted in said space, seated at one end against said sleeve and seated at the other end against said rod so as to bias said rod axially in a direction away from the seat at said one end of the spring.

7. An adjusting mechanism according to claim 6 wherein said spring allows said rod to be displaced axially against its bias to disengage said pin from said receptacle and thereby allow rotation of said stop member on said rod to position said pin in registry with a different receptacle.

* * * * *